(12) United States Patent
Tadinada et al.

(10) Patent No.: US 9,098,097 B2
(45) Date of Patent: Aug. 4, 2015

(54) SYSTEM AND METHOD FOR REMOTE TEMPERATURE SENSING WITH ROUTING RESISTANCE COMPENSATION

(71) Applicant: STMicroelectronics International N.V., Amsterdam (NL)

(72) Inventors: Aswani Aditya Kumar Tadinada, New Delhi (IN); Tanmoy Sen, Noida (IN)

(73) Assignee: STMicroelectronics International N.V., Amsterdam (NL)

( * ) Notice: Subject to any disclaimer, the term of this patent is extended or adjusted under 35 U.S.C. 154(b) by 39 days.

(21) Appl. No.: 14/079,512

(22) Filed: Nov. 13, 2013

(65) Prior Publication Data

US 2015/0130531 A1 May 14, 2015

(51) Int. Cl.
*G01K 7/01* (2006.01)
*G05F 5/00* (2006.01)

(52) U.S. Cl.
CPC ........................................ *G05F 5/00* (2013.01)

(58) Field of Classification Search
None
See application file for complete search history.

(56) References Cited

U.S. PATENT DOCUMENTS

| | | | |
|---|---|---|---|
| 4,114,442 A * | 9/1978 | Pratt | 374/113 |
| 7,083,328 B2 | 8/2006 | Johnson | |
| 7,252,432 B1 * | 8/2007 | Henderson et al. | 374/183 |
| 7,304,905 B2 * | 12/2007 | Hsu et al. | 365/212 |
| 7,647,843 B2 * | 1/2010 | Burton | 73/861.85 |
| 2009/0323763 A1 | 12/2009 | Raychowdhury et al. | |

OTHER PUBLICATIONS

Li et al., "A 1.05V 1.6mW 0.45° C. 3σ-Resolution ΔΣ-Based Temperature Sensor with Parasitic-Resistance Compensation in 32nm CMOS," IEEE International Solid-State Circuits Conference—Digest of Technical Papers, ISSCC 2009, pp. 340-342, 2009.

* cited by examiner

*Primary Examiner* — Lincoln Donovan
*Assistant Examiner* — Terry L Englund
(74) *Attorney, Agent, or Firm* — Seed IP Law Group PLLC

(57) ABSTRACT

An integrated circuit die includes multiple temperature sensor units each for measuring the temperature of respective regions of a semiconductor substrate of the integrated circuit die. The temperature sensor units are each coupled to a multiplexer by respective groups of signal lines. The signal lines include resistance compensation areas for maintaining a particular ratio of resistances of the signal lines of each group.

19 Claims, 9 Drawing Sheets

SYSTEM AND METHOD FOR REMOTE TEMPERATURE SENSING WITH ROUTING RESISTANCE COMPENSATION

BACKGROUND

1. Technical Field

The present disclosure relates to the field of integrated circuit dies. The present disclosure relates more particularly to temperature sensors in integrated circuit dies.

2. Description of the Related Art

The physical properties of the semiconductor substrate affect the functionality of the integrated circuit. The physical properties of the semiconductor substrate are in turn affected by the temperature of the semiconductor substrate.

Integrated circuits generally comprise numerous transistors formed near the surface of a semiconductor substrate. To form transistors the semiconductor substrate is doped at selected areas with donor and acceptor impurity atoms to alter the conductivity of the semiconductor and to provide the desired carrier type. The electron (a negative charge) is the majority carrier in a semiconductor doped with donor atoms. The hole (a positive charge) is the majority carrier in a semiconductor doped with acceptor atoms. The current and voltage characteristics of a transistor depend in part on the effective mobility of the charge carriers.

The physical properties of doped and undoped semiconductor materials are temperature dependent. The mobility of charge carriers in a semiconductor lattice varies with temperature. The conductivity of undoped silicon also depends on temperature. The conductive characteristics of the transistor are heavily dependent on temperature. The switching speed and performance of the transistors are in turn affected by the conductive characteristics of the transistor. The output characteristics of an integrated circuit containing millions or even billions of transistors can be greatly affected by temperature.

Integrated circuits generally comprise many other kinds of circuit elements whose characteristics are also dependent on temperature. Integrated circuits are formed of many interconnecting metal lines formed within a multilevel dielectric stack. The physical characteristics of the metal lines and the layers of the dielectric stack also depend on temperature. The temperature dependence of all of these components of an integrated circuit makes the output characteristics of the integrated circuit dependent on temperature.

Many factors affect the temperature of an integrated circuit. The very use of an integrated circuit will change its temperature. As an integrated circuit is used, the large amounts of current flowing through the many circuit elements cause the temperature of the integrated circuit to increase. The heat generated by the integrated circuit increases and decreases as the demand on the integrated circuit increases and decreases. Thus an integrated circuit can undergo large changes in temperature based solely on its own performance requirements from moment to moment.

In some integrated circuit dies, it is beneficial to know the temperature of particular regions of the integrated circuit die. For this reason some integrated circuit dies include multiple temperature sensors to monitor the temperature of the die at a particular location. Each temperature sensor includes a respective analog-to-digital converter to convert the analog signal output by the temperature sensor to a digital signal. As the complexity of integrated circuit dies has increased, so has the demand for more precise temperature calculations. In order to provide more precise temperature calculations, each analog-to-digital converter must output a digital temperature signal having more bits. In order to output a digital signal with more bits, a larger analog-to-digital converter is needed. With multiple temperature sensors on the integrated circuit die, a very large area of semiconductor substrate is required to accommodate the multiple large analog-to-digital converters.

BRIEF SUMMARY

One embodiment is an integrated circuit die having multiple temperature sensors therein, each to measure the temperature of a particular region of the integrated circuit die. The integrated circuit die also includes a multiplexer and a controller coupled to the output of the multiplexor. The multiplexer couples the temperature sensors to the controller. The temperature sensors provide signals to the controller via the multiplexer. The controller calculates a respective digital temperature value from the signals of each of the temperature sensors.

In one embodiment, the temperature sensors are each coupled to the multiplexer by a respective group of first and second signal lines. Each group of signal lines includes resistance compensation regions which extend the length of the first signal line of the group with respect to the second signal line of the group in order to maintain a particular ratio of the resistance of the first signal line with respect to the resistance of the second signal line.

The multiplexer selectively couples one of the groups of first and second signal traces to the controller, thereby electrically coupling the controller to one of the temperature sensors. The controller includes a voltage generator that generates an analog temperature signal based on signals received from the first and second conductive signal lines. The controller includes an analog-to-digital converter coupled to the voltage generator. The analog-to-digital converter receives the analog temperature signal and converts it to a digital temperature signal.

Thus, a single analog-to-digital converter is used to calculate digital temperature signals for multiple temperature sensors a relatively large distance from the analog-to-digital converter. Without the resistance compensation regions for the respective groups of signal lines, the parasitic resistances in the signal lines could cause inaccuracies in the digital temperature signals. However, the resistance compensation portions of the groups of signal lines help to ensure that the ratio of the resistances of the first and second signal lines of each group is at a particular value which reduces inaccuracies in the digital temperature signals.

DETAILED DESCRIPTION

Figure 1:
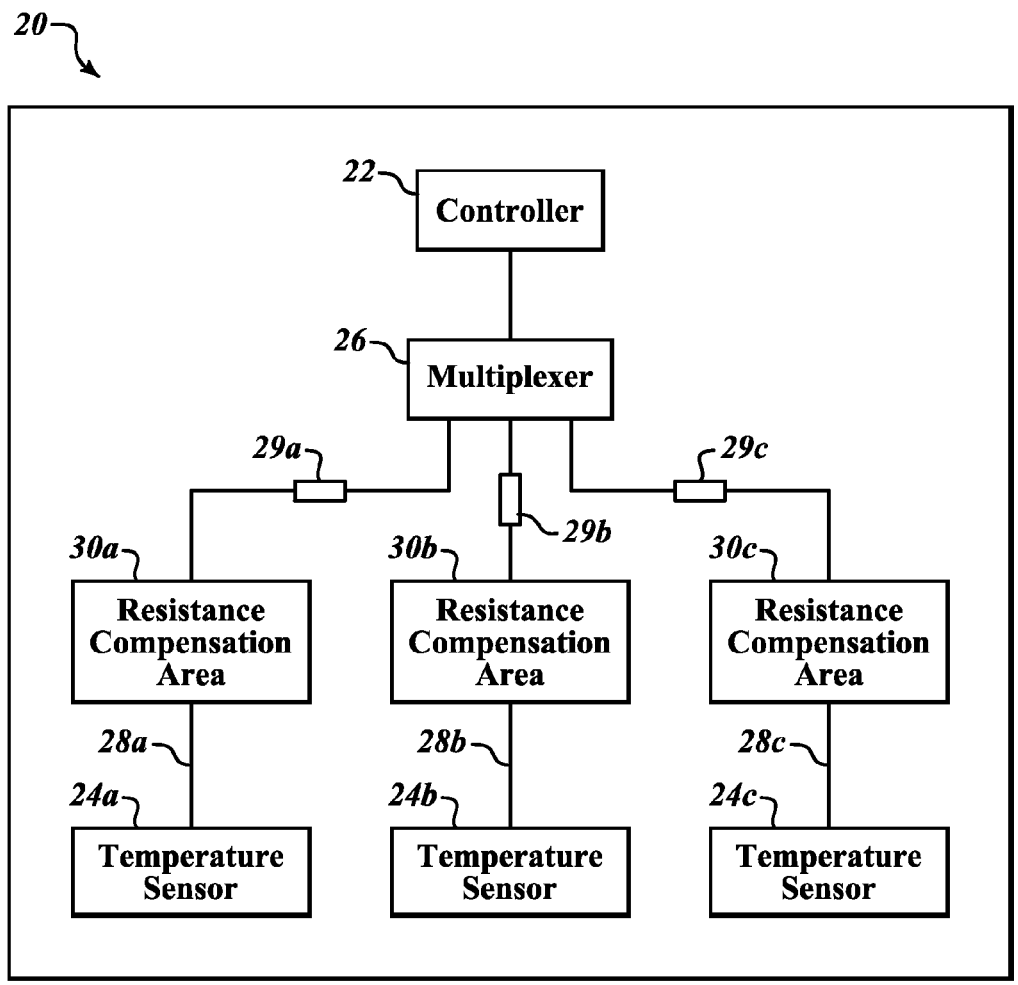
FIG. 1 is a block diagram of an integrated circuit die according to one embodiment.

FIG. 1 is a block diagram of an integrated circuit die 20 according to one embodiment. The integrated circuit die 20 includes a controller 22 and temperature sensors 24a-24c. A multiplexer 26 is coupled between the controller 22 and the temperature sensors 24a-24c. Signal lines 28a-28c electrically couple the temperature sensors 24a-24c to the multiplexer 26. The boxes 29a-c represent the parasitic resistances of the signal lines 28a-c respectively. The signal lines 28a-28c include resistance compensation areas 30a-30c.

The temperature sensors 24a-24c each measure the temperature of a respective region of the integrated circuit die 20. It is beneficial for the controller 22 to have an accurate measurement of the temperature of the various regions of the integrated circuit die 20. For example, in order to improve function of the various components of the integrated circuit die 20 such as memory circuits, processing circuits, analog circuits, and other components of the integrated circuit die 20, the controller 22 obtains temperature data based on the outputs of the temperature sensors 24a-24c and controls the operations of the components based on the obtained temperature data. In order to obtain accurate temperature data for the various components, temperature sensors 24a-24c are each placed near a respective component of the integrated circuit die 20. The temperature sensors 24a-24c output signals indicative of temperature of the respective regions of integrated circuit die 20.

The multiplexer 26 enables the controller 22 to receive signals from the temperature sensors 24a-24c in order to generate digital temperature signals corresponding to the temperature of the integrated circuit die 20 in the respective regions thereof. The multiplexer 26 selectively couples one of the temperature sensors 24a-24c to the controller 22. For example, when the multiplexer 26 selectively couples the temperature sensor 24a to the controller 22, the controller 22 reads a signal from the signal line 28a. The controller 22 generates a digital temperature signal corresponding to the temperature of the region of the integrated circuit die 20 adjacent to the temperature sensor 24a. The multiplexer 26 then decouples the temperature sensor 24a from the controller 22 and couples the temperature sensor 24b to the controller 22. The controller 22 receives a signal from the signal line 28b and generates a digital temperature signal corresponding to the temperature of the integrated circuit die in the region adjacent to the temperature sensor 24b. The multiplexer 26 then decouples the temperature sensor 24b from the controller 22, and couples the temperature sensor 24c to the controller 22. The controller 22 reads a signal from the signal line 28c and generates a digital temperature signal corresponding to the temperature of the integrated circuit die 20 in the region adjacent to the temperature sensor 24c. In this way the multiplexer 26 assists the controller 22 to communicate with the temperature sensors 24a-24c. The multiplexer can operate on a scan so that each temperature sensor 24a-24c is coupled to the controller on a regular and frequent basis, several times per millisecond, to ensure accurate and current temperature information from all parts of the die using just one controller 22 and analog to digital converter.

Because the temperature sensors 24a-24c are located in regions of the integrated circuit die 20 remote from the controller 22, signal lines 28a-28c are relatively lengthy, which can cause problems in generating accurate digital temperature signals in the controller 22. This is due in part to the fact that the parasitic resistances associated with the signal lines 28a-28c can become very large. The parasitic resistances can reduce the accuracy of the digital temperature signals generated by the controller 22.

In one embodiment, each signal line 28a-28c represents a group of multiple signal lines. Thus, multiple signal lines 28a couple the temperature sensor 24a to the multiplexer 26. Likewise, multiple signal lines 28b couple the temperature sensor 24b to the multiplexer 26. Finally, multiple signal lines 28c couple the temperature sensor 24c to the multiplexer 26. The accuracy of the digital temperature signals generated by the controller 22 can be promoted by ensuring that the resistances of multiple signal lines 28a have a selected ratio with respect to each other, that the resistances of the multiple signal lines 28b also have the selected ratio with respect to each other, and that the resistances of multiple signal lines 28c have the selected ratio with respect to each other. The ratio can be selected so that the digital temperature signals are largely independent of the parasitic resistances of the signal lines 28a-28c, as will be explained in more detail with respect to other figures.

The resistance compensation areas 30a-30c help to ensure that the selected ratio is met by each of the pluralities of signal lines 28a-28c. In one embodiment the resistance compensation areas 30a-30c correspond to areas in which the lengths of the signal lines 28a-28c are varied with respect to each other. For example, in the resistance compensation area 30a the length of one of the signal lines 28a is greater than the length of another signal line 28a. The difference in lengths of the signal lines 28a in the resistance compensation area 30a depends on the overall length of the signal lines 28a. As the overall length of the signal lines 28a becomes longer, the difference in lengths, and therefore resistances, of the signal lines 28a in the resistance compensation area 30a will become larger. This is the case for each of the resistance compensation areas 30a-30c. The resistance compensation areas 30a-30c therefore help to ensure that accurate digital temperature signals will be generated by ensuring that the selected ratio is achieved within each of the groups of signal lines 28a-28c.

In one embodiment, there are multiple resistance compensation areas 30a positioned along the signal lines 28a. Likewise, there are multiple resistance compensation areas 30b positioned along the signal lines 28b. There can also be multiple resistance compensation areas 30c positioned at different locations along the signal lines 28c.

In one embodiment, the resistance compensation areas 30a-30c correspond to regions of the signal lines 28a-28c in which one of the signal lines has a higher resistance than another signal line by using different materials or different widths for the respective signal lines. Those of skill in the art will note that many other methods can be implemented for achieving the selected ratio in light of the present disclosure.

Figure 2:
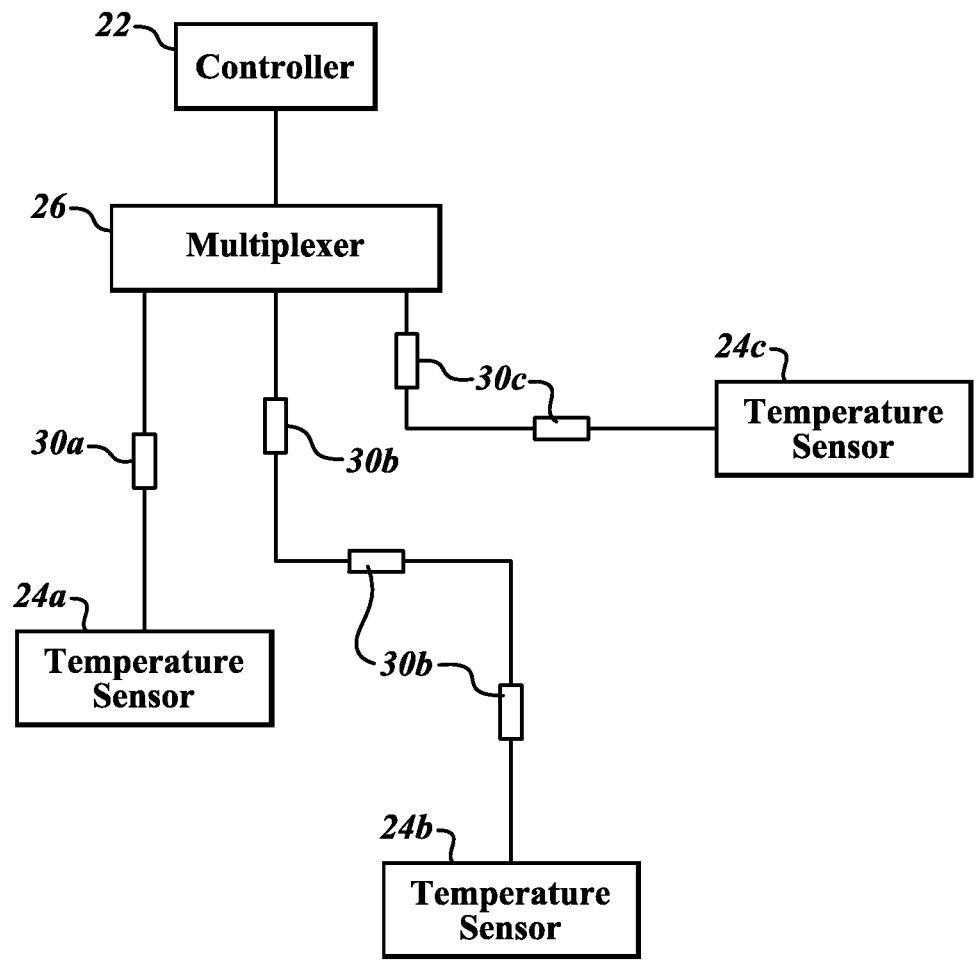
FIG. 2 is a block diagram of an integrated circuit die according to one embodiment.

FIG. 2 is a block diagram of an integrated circuit die 20 according to one embodiment. The integrated circuit die 20 includes controller 22, multiplexer 26, and temperature sensors 24a-24c coupled to the multiplexer 26 by signal lines 28a-c as described previously with respect to FIG. 1. The integrated circuit die 20 also includes a single resistance compensation area 30a, three resistance compensation areas 30b, and two resistance compensation areas 30c in the respective signal lines 28a-c.

Because there are many components on the integrated circuit die, and many types of signal lines connecting the several components, the signal lines 28a-c typically will have to be routed around other components or signal lines in order to connect the temperatures sensors 24a-24c to the multiplexor 26. Thus the signal lines 28a-c will include many corner and straight line segments in order to connect the temperatures sensors 24a-24c to the multiplexor 26.

In one embodiment, the number of resistance compensation areas 30a, 30b, or 30c corresponds to the number of straight line portions of the routing lines 28a-c. For each straight line portion of the routing lines, there is a corresponding resistance compensation area 30a, 30b, or 30c. A single straight routing segment connects the temperatures sensor 24a to the multiplexor 26. Accordingly, a single resistance compensation area 30a is present on the signal lines 28a. Three straight routing segments connect the temperature sensor 24b to the multiplexor 26. Accordingly, three resistance compensation areas 30b are present on the signal lines 28b. Two straight routing segments connect the temperature sensor 24c to the multiplexor 26. Accordingly, two resistance compensation areas 30c are present on the signal lines 28c.

In one embodiment, the number of resistance compensation areas 30a, 30b, or 30c depends on the distance between the respective temperature sensors 24a-24c and the multiplexer 26. This can include having more than one resistance compensation area 30a-30c in a single straight routing segment if the straight routing segment is particularly long. Thus, the longer the distance that a group of signal lines 28a-c extends, the greater the number of resistance compensation areas 30a-30c.

As described previously, the resistance compensation areas 30a, 30b, and 30c are areas in which the resistance of one of the signal lines 28a is greater than the resistance of another of the signal lines 28a, the resistance of one of the signal lines 28b is greater than another of the signal lines 28b, or the resistance of one of the signal lines 28c is greater than another of the signal lines 28c. In this way, the selected resistance ratio can be maintained for each of the groups of signal lines 28a-28c, thereby promoting accuracy of the digital temperature signals generated by the controller 22.

In one embodiment, the resistance compensation areas 30a-30c are areas in which the path length of one signal line is greater than the path length of another signal line, thereby increasing a difference in the resistance of one signal line with respect to the other. Alternatively, the resistance compensation areas 30a-30c can be areas in which one signal line is made of a more resistive material than another of the signal lines. In another example, the resistance compensation areas 30a-30c can be areas in which one signal line has a decreased cross-sectional area than another of the signal lines, thereby increasing the resistance of one signal line with respect to the other. Those of skill in the art will recognize that many other methods can be implemented for the resistance compensation areas 30a-30c in light of the present disclosure.

Figure 3:
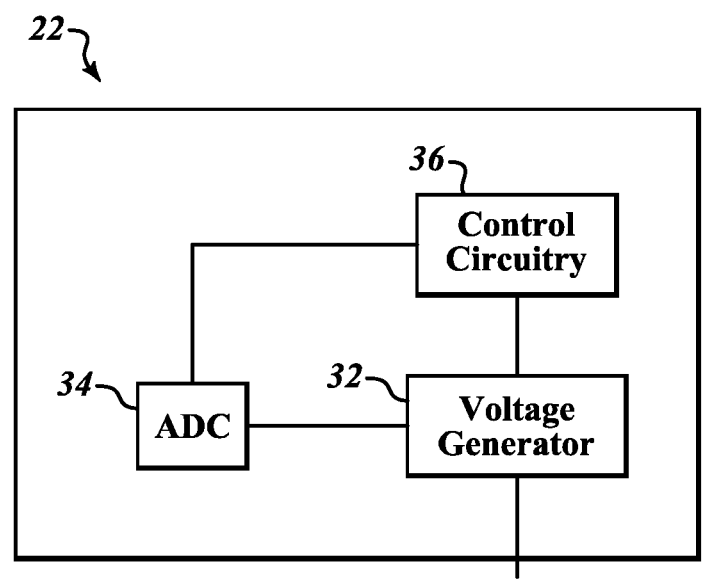
FIG. 3 is a block diagram of a controller according to one embodiment.

FIG. 3 is a block diagram of the controller 22 of the integrated circuit die 20 according to one embodiment. The controller 22 includes a voltage generator 32, an analog-to-digital converter 34, and control circuitry 36.

The voltage generator 32 is coupled to one of the temperature sensors 24-24c by the multiplexer 26. When the voltage generator 32 is coupled to the temperature sensor 24a, the voltage generator 32 receives a signal from the temperature sensor 24a and generates an analog temperature signal corresponding to the temperature of the integrated circuit die in the region adjacent to the temperature sensor 24a.

The analog-to-digital converter 34 receives the analog temperature signal from the voltage generator 32. The analog-to-digital converter 34 converts the analog temperature signal to a digital temperature signal.

The control circuitry 36 receives the digital temperature signal from the analog-to-digital converter 34 and computes a temperature value corresponding to the temperature of the region of the integrated circuit die 20 adjacent to the temperature sensor 24a. The control circuitry 36 can compute the temperature value by referring to a data table stored in memory in which digital temperature data are stored with the corresponding temperature values. Thus, when the digital temperature signal is received from the analog-to-digital converter 34, the control circuitry 36 looks up the digital signal in a data table and retrieves a temperature value corresponding to the digital signal. Those of skill in the art will recognize that many other methods can be employed to compute a temperature value in light of the present disclosure.

The multiplexer 26 couples the voltage generator 32 to each of the temperature sensors 24a-24c in turn. The voltage generator 32 generates an analog temperature signal corresponding to whichever temperature sensor 24a-24c is coupled to the voltage generator 32 at that time. The analog-to-digital converter 34 and the control circuitry 36 compute the digital temperature signal and the temperature value for each of the temperature sensors 24a-24c in turn as described above in relation to the temperature sensor 24a.

Figure 4:
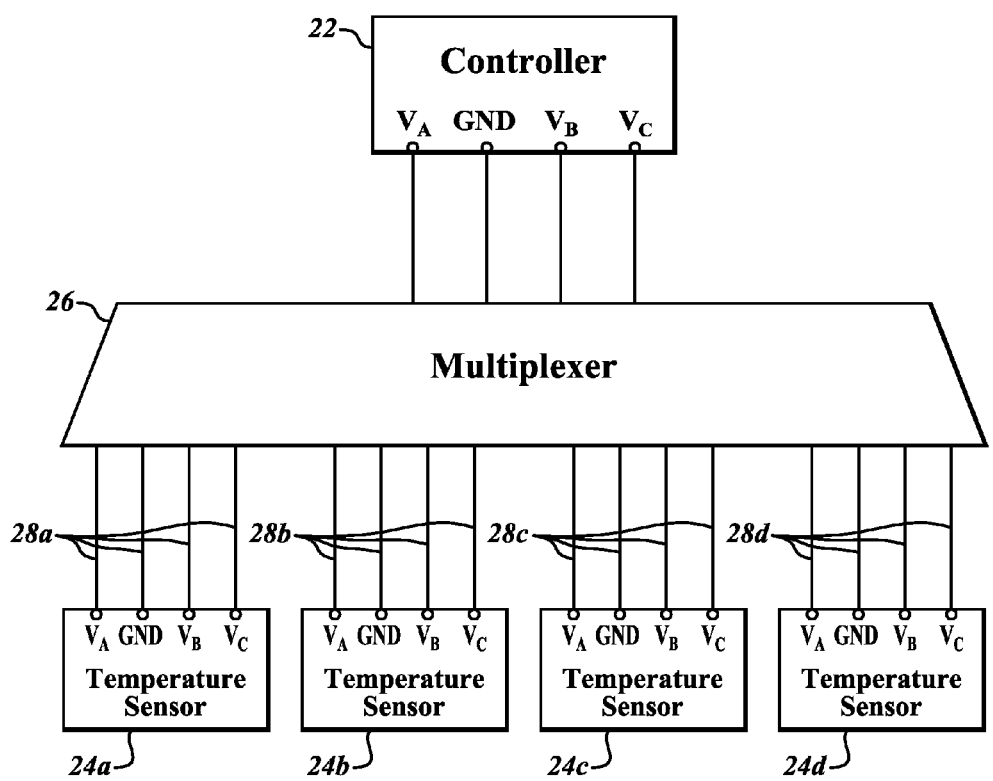
FIG. 4 is a schematic diagram of an integrated circuit die according to one embodiment.

FIG. 4 illustrates a schematic diagram of an integrated circuit die 20 according to one embodiment. The integrated circuit die 20 includes the controller 22, the multiplexer 26, and the temperature sensors 24a-24c as described previously. FIG. 4 includes a further temperature sensor 24d. Though not shown in FIG. 4, the temperature sensor 24d is located adjacent to the controller 22 and therefore serves to sense the temperature of the semiconductor substrate in the region of the controller 22, while the temperature sensors 24a-24c sense the temperature in regions remote from the controller 22.

The temperature sensor 24a is coupled to the multiplexer 26 by a group of signal lines 28a. The temperature sensor 24b is coupled to the multiplexer 26 by a group of signal lines 28b. The temperature sensor 24c is coupled to the multiplexer 26 by a group of signal lines 28c. The temperature sensor 24d is coupled to the multiplexer 26 by a group of signal lines 28d.

The ratio of the resistances of the signal lines $V_C$ and $V_B$ for each of the groups of signal lines 28a-28d satisfies a selected ratio as described in more detail below. In this way, the distance of the temperature sensors 24a-24d of the controller 22 will not adversely affect the accuracy of the temperature values generated by the controller 22.

As described above, the multiplexer 26 selectively couples one of the groups of signal lines 28a-28d to the controller 22. The controller 22 calculates a value of the temperature of the integrated circuit die in the region adjacent to the selected temperature sensor 24a, 24b, 24c, or 24d.

Figure 5:
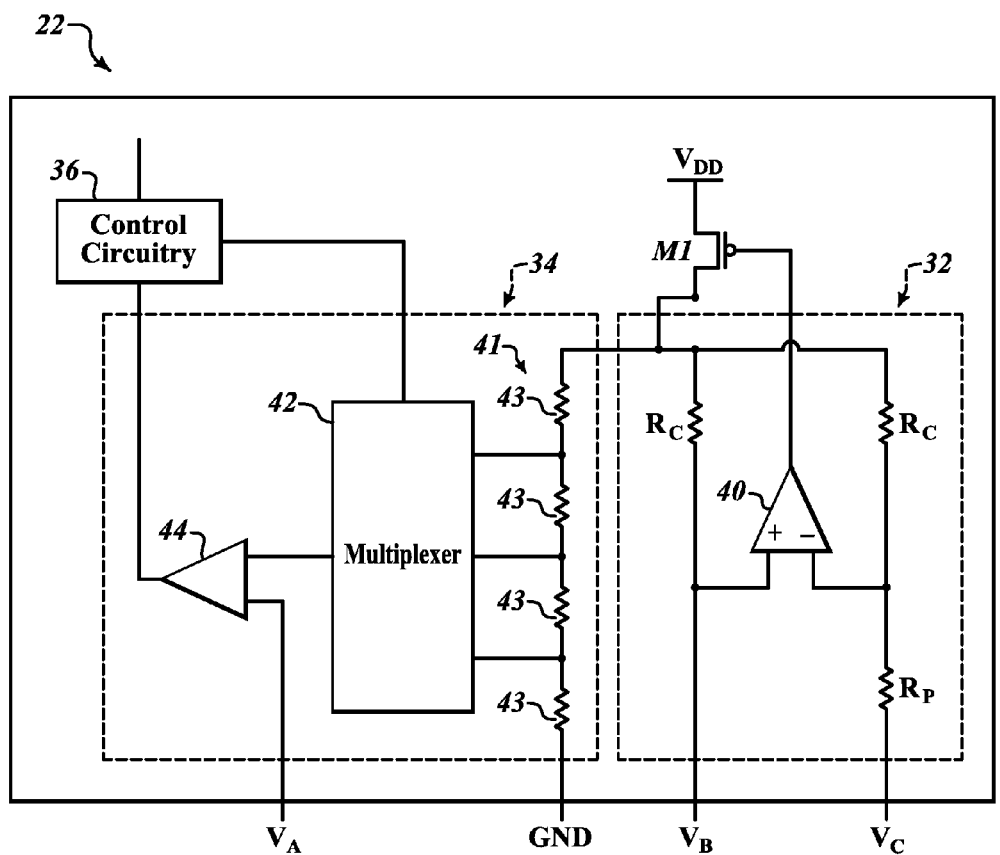
FIG. 5 is a schematic diagram of a controller according to one embodiment.

FIG. 5 is a schematic diagram of the controller 22 according to one embodiment. The controller 22 includes a voltage generator 32 coupled to an analog-to-digital converter 34. The analog-to-digital converter 34 is coupled to the control circuitry 36.

The voltage generator 32 is coupled to voltages $V_B$ and $V_C$ by the multiplexer 26, not pictured in FIG. 5. The analog-to-digital converter 34 is coupled to voltages $V_A$, GND by the multiplexer 26. The voltages $V_A$, GND, $V_B$, and $V_C$ correspond to one of the groups of signal lines 28a, 28b, or 28c, coupled to the temperature sensors 24a-24c. Thus, each temperature sensor 24a-24c is coupled to the multiplexer 26 by a respective group of four signal lines $V_A$, GND, $V_B$, $V_C$. The multiplexer 26 couples one of the groups of signal lines to the controller 22, thereby coupling the controller 22 to a corresponding one of the temperature sensors 24a-24c.

The voltage generator includes a PMOS transistor M1 having a gate terminal coupled to the output of an amplifier

40. One input of the amplifier 40 is coupled to the signal line $V_C$ through a resistor Rp. The other input of the amplifier 40 is coupled to the signal line $V_B$. The resistors Rc are each coupled between a respective input of the amplifier 40 and the drain of the PMOS transistor M1. The drain of the PMOS transistor M1 corresponds to the output of the voltage generator 32.

The analog-to-digital converter 34 includes a resistor ladder 41 having a plurality of resistors 43. The analog-to-digital converter 34 includes multiplexer 42 having a plurality of inputs between the resistors 43 of the resistor ladder 41. The multiplexer 42 includes an output coupled to a comparator 44. The comparator 44 includes a second input coupled to signal line $V_A$. An output of the comparator 44 is coupled to the control circuitry 36.

The voltage generator 32 functions by receiving signals on the signal lines $V_B$ and $V_C$ from one of the temperature sensors 24a-24c via the multiplexer as described previously. The amplifier 40 receives the signals from $V_B$ and $V_C$ and outputs an amplified signal to the gate of the PMOS transistor M1. The PMOS transistor M1 passes a current corresponding to the difference in the voltage VDD at the source of the PMOS transistor M1 and the amplified voltage on the gate of the PMOS transistor M1. The current passes through the resistors Rc to the currently connected temperature sensor 24a, 24b, or 24c causing a voltage drop across the resistors, thereby generating a voltage at the drain of M1. The voltage at the drain of M1 corresponds to the bandgap of the semiconductor substrate in the region adjacent to the currently selected temperature sensor 24a, 24b, or 24c. The bandgap of the semiconductor substrate in the selected region varies with the temperature of the semiconductor substrate in the selected region. The bandgap of the semiconductor substrate in the selected region therefore corresponds to the temperature of the semiconductor substrate in the selected region.

The bandgap voltage is applied across the resistor ladder of the analog-to-digital converter 34, thereby generating particular voltages at the inputs of the multiplexer 42. The multiplexer 42 outputs to the comparator 44 in turn the voltages on the various inputs of the multiplexer 42. The comparator 44 compares each of these values to the value of the signal line $V_A$ and outputs a series of signals corresponding to a digital temperature signal. The control circuitry 36 receives the digital temperature signal and computes a temperature value corresponding to the temperature of the semiconductor substrate in the region of the integrated circuit die adjacent to the selected temperature sensor 24a, 24b, or 24c. The multiplexer 26 couples the controller 22 to each of the temperature sensors 24a-24c in turn and the controller 22 computes a respective temperature value for each of the temperature sensors 24a-24c.

Figure 6:
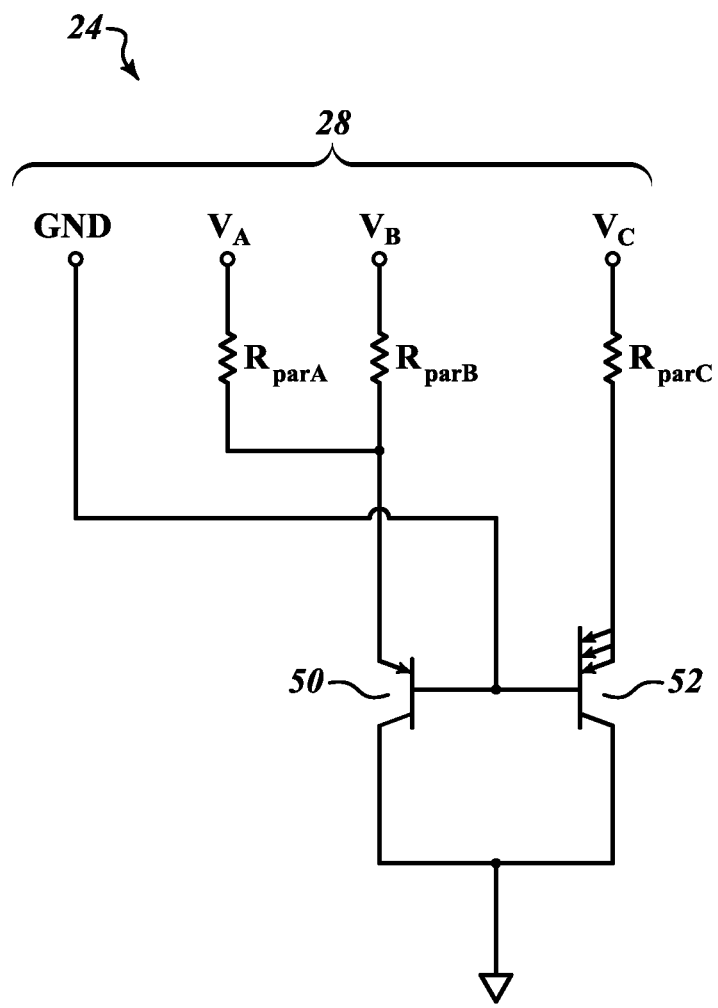
FIG. 6 is a schematic diagram of a temperature sensor according to one embodiment.

FIG. 6 is a schematic diagram of a temperature sensor 24 according to one embodiment. The temperature sensor 24 includes a first bipolar transistor 50 and a second bipolar transistor 52 having their base terminals coupled together. The base terminals of the bipolar transistors 50 and 52 are in turn coupled to GND. The bipolar transistor 50 includes an emitter terminal coupled to the signal lines $V_A$ and $V_B$. The bipolar transistor 52 includes N emitter terminals coupled to the signal line $V_C$. Because the base terminals are grounded, the voltage on the terminals $V_A$ and $V_B$ corresponds to the base emitter voltage $V_{be50}$ of the bipolar transistor 50 and the voltage on the terminal $V_C$ corresponds to the base emitter voltage $V_{be52}$ of the bipolar transistor 52.

The parasitic resistance $R_{parA}$ corresponds to the resistance of the signal line $V_A$. The parasitic resistance $R_{parB}$ corresponds to the resistance of the signal line $V_B$. The parasitic resistance $R_{parC}$ corresponds to the resistance of the signal line $V_C$.

In one embodiment the selected resistance ratio corresponds to the $R_{parC}/R_{parB}$. Therefore, the resistance compensation units 30a-30c described above function to increase one of the resistances $R_{parC}$ or $R_{parB}$ with respect to the other according to the selected resistance ratio.

The bandgap voltage Vbg as output at the drain of the transistor M1 together with the voltage on the signal line $V_A$ are converted to a digital word DATA using the following equation:

$$DATA = (Vbg - Va) * Num / Vbg,$$

where Num is the number of resistors 43 in the resistor ladder 41 of the analog-to-digital converter 34. It can be shown that DATA becomes independent of $R_{parC}$ and $R_{parB}$ and when the following ratio is satisfied:

$$R_{parC}/R_{parB} = 1 + Rp/RC + (Vt/V_{be50}) * Rp/Rc.$$

Thus, the above equation corresponds to the selected ratio. When the resistances of the signal line $V_B$ and $V_C$ satisfy the above ratio, DATA becomes independent of the parasitic resistances $R_{parC}$ and $R_{parB}$. This means that as long as the selected resistance ratio is satisfied for each temperature sensor unit 24 in the integrated circuit die, the temperature sensor units can be very far from the controller 22 without decreasing the accuracy of the computed temperature values. Thus, a single analog-to-digital converter 34 can be used in the controller 22 instead of a separate analog-to-digital converter for each temperature sensor 24. Accuracy of the temperature values is maintained while saving valuable area in the semiconductor substrate.

Figure 7:
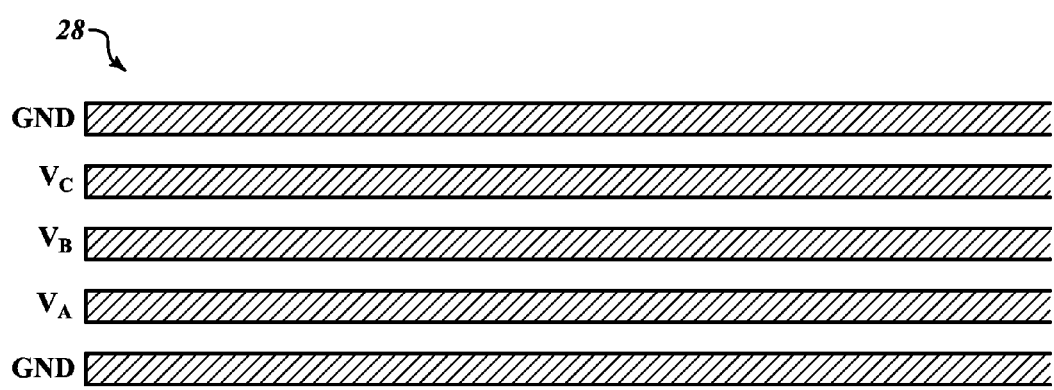
FIG. 7 is a top view of signal lines according to one embodiment.

FIG. 7 is a top view of a straight line segment group of signal lines 28. The group of signal lines includes signal lines $V_A$, $V_B$, $V_C$, and two ground lines GND. The signal lines $V_A$, $V_B$, and $V_C$ correspond to the signal lines $V_B$ $V_A$, $V_B$, and $V_C$ shown in FIGS. 4 and 6.

Figure 8:
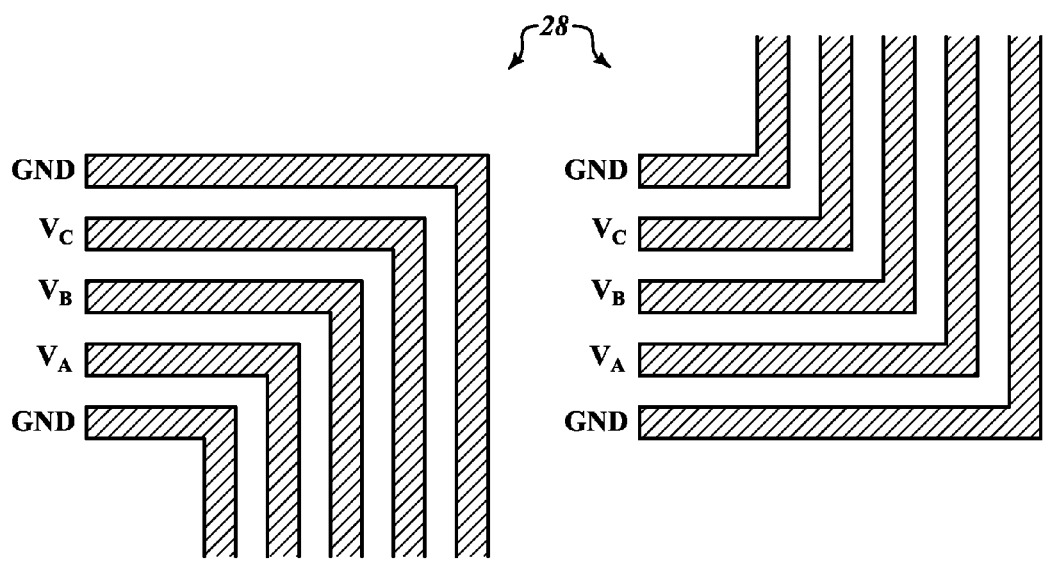
FIG. 8 is a top view of corner routing of signal lines according to one embodiment.

FIG. 8 is a top view of corner routing portions of the group of signal lines $V_A$, $V_B$, and $V_C$. As described previously, the groups of signal lines typically will be routed around intervening components as they extend between the temperature sensors 24a-24c and the multiplexor 26. The corner portions of FIG. 8 correspond to left and right hand turns in the signal lines.

Figure 9:
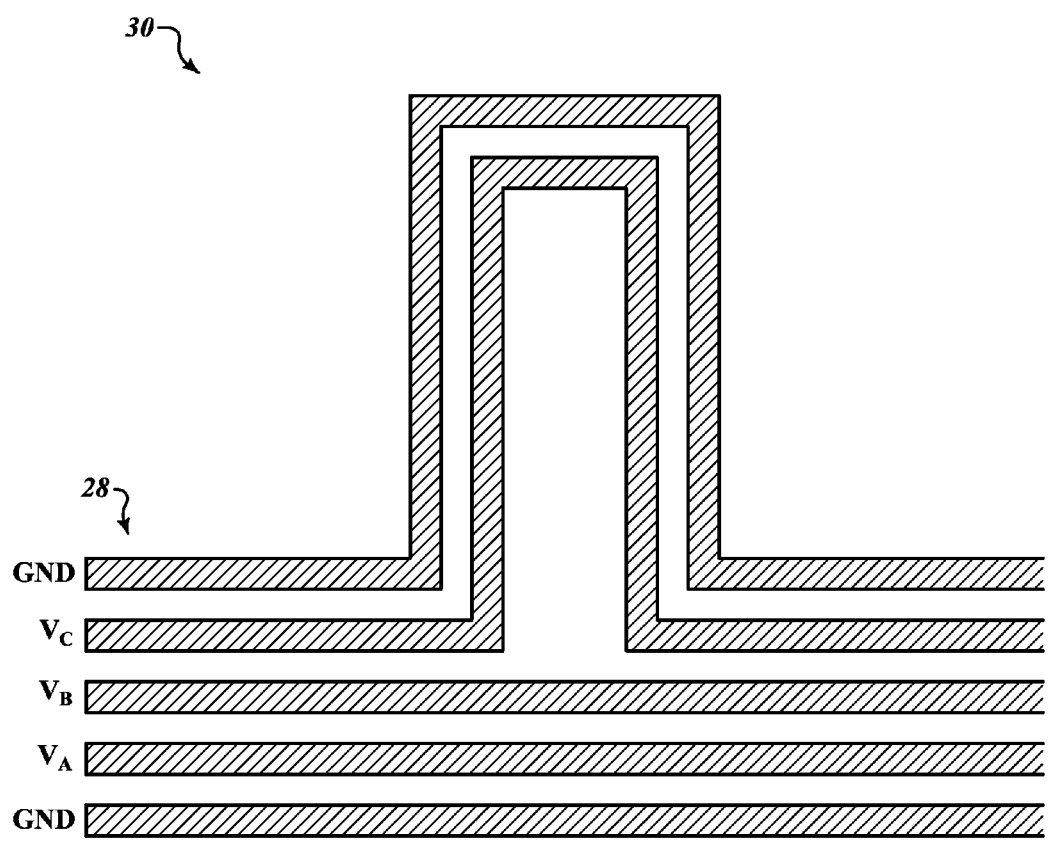
FIG. 9 is a top view of signal lines including a resistance compensation area according to one embodiment.

FIG. 9 is a top view of a resistance compensation area 30 according to one embodiment. The group of signal lines 28 includes two ground lines GND and the signal lines $V_A$, $V_B$, and $V_C$. In the resistance compensation area 30, a bend in the path of the signal line $V_C$ allows for the signal line $V_C$ to have a greater length than the length of signal line $V_B$ in the resistance compensation area. In particular, in the resistance compensation area 30, the signal line $V_C$ bends while $V_B$ and $V_A$ remain straight. This allows for the signal line $V_C$ to have a greater length than the length of signal line $V_B$ in the resistance compensation area 30.

The parasitic resistances $R_{parC}$ and $R_{parB}$ are proportional to the total lengths of the signal lines $V_C$ and $V_B$. The longer the signal lines $V_C$ and $V_B$, the larger the parasitic resistances $R_{parC}$ and $R_{parB}$. Without the presence of the resistance compensation areas 30, the parasitic resistances $R_{parC}$ and $R_{parB}$ would be approximately equal to each other and the selected ratio would not be achieved. Thus, to achieve the selected ratio, the resistance compensation areas 30 are included to lengthen the path length of one signal line with respect to each other.

Those of skill in the art will understand that there are many ways to increase the path length of the signal line $V_C$ with respect to $V_B$ in a resistance compensation area 30 in light of the present disclosure. All such other ways to increase the path length of one signal line with respect to another fall within the scope of the present disclosure.

In one embodiment, each of the signal lines GND, $V_A$, $V_B$, and $V_C$ are formed in metal layer Mn. A first ground plane is formed below the signal lines in metal layer Mn−1. A second ground plane is formed above the signal lines in the metal layer Mn+1. In this way the signal lines $V_A$, $V_B$, and $V_C$ are completely enclosed in a grounded tube, though the signal lines are separated from the grounded tube by a dielectric layer that is not illustrated.

There are other ways to achieve the selected ratio of $R_{parC}$ to $R_{parB}$ than those set forth above. For example, the signal line $V_C$ could have a smaller width than the signal line $V_B$, thereby achieving a larger resistance. Alternatively, there could be segments in the signal line $V_C$ made from a more highly resistive material than the other portions of the signal lines $V_C$ and $V_B$, thereby increasing the resistance of $V_C$ with respect to $V_B$. Those of skill in the art will recognize that there are many other ways to increase the resistance of one signal line with respect to another in light of the present disclosure. All such other ways to increase the resistance fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit die comprising:
   a controller including:
      an analog-to-digital converter having an input;
      a bandgap voltage generator coupled to the input of the analog-to-digital converter and configured to provide a bandgap voltage to the analog-to-digital converter;
      a first input coupled to the bandgap voltage generator;
      a second input coupled to the bandgap voltage generator;
   a multiplexer coupled to the controller;
   a plurality of temperature sensor units;
   a plurality of groups of conductive signal lines, each group of conductive signal lines electrically connecting a respective one of the temperature sensor units to the multiplexer, each group of conductive signal lines including:
      a respective first signal line;
      a respective second signal line; and
      a respective plurality of resistance compensation areas in which a length of the first signal line is extended with respect to a length of the second signal line, the multiplexer configured to selectively electrically couple a respective one of the groups of conductive signal lines to the first and second inputs of the controller.

2. The integrated circuit die of claim 1 wherein a ratio of the length of the first signal line to the length of the second signal line is approximately equal for each respective group of conductive signal lines.

3. The integrated circuit die of claim 1 wherein each group of conductive signal lines includes a respective third conductive signal line.

4. The integrated circuit die of claim 1 wherein the bandgap voltage generator is configured to receive a signal from a respective one of the temperature sensor units via the multiplexer and to generate the bandgap voltage.

5. The integrated circuit die of claim 1 wherein the analog-to-digital converter is configured to receive the bandgap voltage from the bandgap voltage generator and output a digital signal indicative of a temperature of the respective temperature sensor unit.

6. The integrated circuit die of claim 5 wherein each temperature sensor unit includes a respective pair of bipolar transistors.

7. The integrated circuit die of claim 1 wherein each temperature sensor unit outputs a temperature signal on the respective group of conductive signal lines indicative of a temperature of a respective region of the integrated circuit die.

8. An integrated circuit die comprising:
   a semiconductor substrate;
   a first temperature sensor in a first region of the integrated circuit die;
   a second temperature sensor in a second region of the integrated circuit die;
   a multiplexer;
   a first signal line having a first length;
   a second signal line having a second length, the first and second signal lines electrically connecting the first temperature sensor to the multiplexer;
   a third signal line having a third length;
   a fourth signal line having a fourth length, the third and fourth signal lines electrically connecting the second temperature sensor to the multiplexer, a ratio of the first length to the second length being approximately equal to a ratio of the third length to the fourth length;
   a controller coupled to the multiplexer, the multiplexer configured to selectively couple the first and the second signal lines to the controller or the third and the fourth signal lines to the controller, the controller configured to calculate a respective temperature value for each of the first and second temperature sensors.

9. The integrated circuit die of claim 8 wherein the controller comprises:
   a voltage generator configured to generate a first voltage corresponding to a temperature of the first temperature sensor and to generate a second voltage corresponding to a temperature of the second temperature sensor; and
   an analog-to-digital converter coupled to the voltage generator and configured to receive the first voltage and the second voltage and to output a first digital signal and a second digital signal based on the first voltage and the second voltage, respectively.

10. The integrated circuit die of claim 9 wherein the voltage generator is a bandgap voltage generator, the first voltage corresponding to a bandgap of the semiconductor substrate in the first region, and the second voltage corresponding to a bandgap of the semiconductor substrate in the second region.

11. The integrated circuit die of claim 10 wherein the first and the second temperature sensors each include a respective pair of bipolar transistors.

12. The integrated circuit die of claim 11 comprising a plurality of first resistance compensation regions, a path length of the first signal line in the first resistance compensation regions being longer than a path length of the second signal line in the first resistance compensation regions.

13. The integrated circuit die of claim 12 comprising a plurality of second resistance compensation regions, a path length of the third signal line in the second resistance compensation regions being longer than a path length of the fourth signal line in the second resistance compensation regions.

14. The integrated circuit die of claim 13 wherein the first length is longer than the third length and there are more first resistance compensation regions than second resistance compensation regions.

15. A method for forming an integrated circuit die, the method comprising:
   forming a first temperature sensor adjacent a first region of a semiconductor substrate;
   forming a second temperature sensor adjacent a second region of the semiconductor substrate;
   forming a multiplexer;
   forming a first signal line having a first length;
   forming a second signal line having a second length, the first and the second signal lines electrically connecting the first temperature sensor to the multiplexer;
   forming a third signal line having a third length;
   forming a fourth signal line having a fourth length, the third and fourth signal lines electrically connecting the second temperature sensor to the multiplexer, a ratio of the first length to the second length being approximately equal to a ratio of the third length to the fourth length; and
   forming a controller coupled to the multiplexer, the multiplexer configured to selectively couple the first and the second signal lines to the controller or the third and the fourth signal lines to the controller, the controller configured to calculate a respective temperature value for each of the first and second temperature sensors.

16. The method of claim 15 wherein forming the first and second signal lines comprises forming a plurality of first resistance compensation regions, a path length of the first signal line in the first resistance compensation regions being longer than a path length of the second signal line in the first resistance compensation regions.

17. The method of claim 16 wherein forming the third and the fourth signal lines includes forming a plurality of second resistance compensation regions, a path length of the third signal line in the second resistance compensation regions being longer than a path length of the fourth signal line in the second resistance compensation regions.

18. The method of claim 15 wherein the controller comprises:
   a voltage generator configured to generate a first voltage corresponding to a temperature of the first temperature sensor and to generate a second voltage corresponding to a temperature of the second temperature sensor; and
   an analog to digital converter coupled to the voltage generator and configured to receive the first voltage and the second voltage and to output a first digital signal and a second digital signal based on the first voltage and the second voltage, respectively.

19. The method of claim 18 wherein the first and the second temperature sensors each include a respective pair of bipolar transistors.

* * * * *